United States Patent [19]

Euerle

[11] 4,369,809
[45] Jan. 25, 1983

[54] BACK-PRESSURE VALVE FOR HEATING INSTALLATIONS

[76] Inventor: Karl Euerle, Bruckstrasse 73, D-7463 Rosenfeld 5, Fed. Rep. of Germany

[21] Appl. No.: 242,768

[22] Filed: Mar. 11, 1981

Related U.S. Application Data

[62] Division of Ser. No. 36,904, May 7, 1979, Pat. No. 4,273,155.

[30] Foreign Application Priority Data

May 9, 1978 [DE] Fed. Rep. of Germany ... 7813921[U]

[51] Int. Cl.³ .............................................. F16K 15/02
[52] U.S. Cl. ............................ 137/543.19; 137/543.21
[58] Field of Search .............. 137/543.21, 540, 533.17, 137/533.19, 534, 543.17, 543.19

[56] References Cited

U.S. PATENT DOCUMENTS

| 1,602,372 | 10/1926 | Bullen | 137/543.19 |
| 1,620,524 | 3/1927 | DeLuiz | 137/540 |
| 3,700,001 | 10/1972 | Rodel | 137/543.21 |
| 3,862,281 | 1/1975 | Uchiyama | 137/533.17 X |

FOREIGN PATENT DOCUMENTS

| 673045 | 2/1939 | Fed. Rep. of Germany | 137/543.17 |
| 1500010 | 11/1969 | Fed. Rep. of Germany | 137/543.21 |
| 1017497 | 12/1952 | France | 137/540 |
| 1155758 | 6/1969 | United Kingdom | 137/543.21 |

Primary Examiner—Robert G. Nilson
Attorney, Agent, or Firm—Edwin E. Greigg

[57] ABSTRACT

An improved back-pressure valve for heating installations having an annular mask 7 mounted transverse of a channel in a pipe or pump, guiding means 13 affixed to the mask 7 diametrically and extending along the channel, a sealing disc 8 for covering an opening formed by the annular mask and having two diametrically opposed protuberances 12 extending into the guiding means 13 to make the sealing disc 8 pivotally and linearly movable in response to the fluid flow passing through the pipe or pump.

4 Claims, 3 Drawing Figures

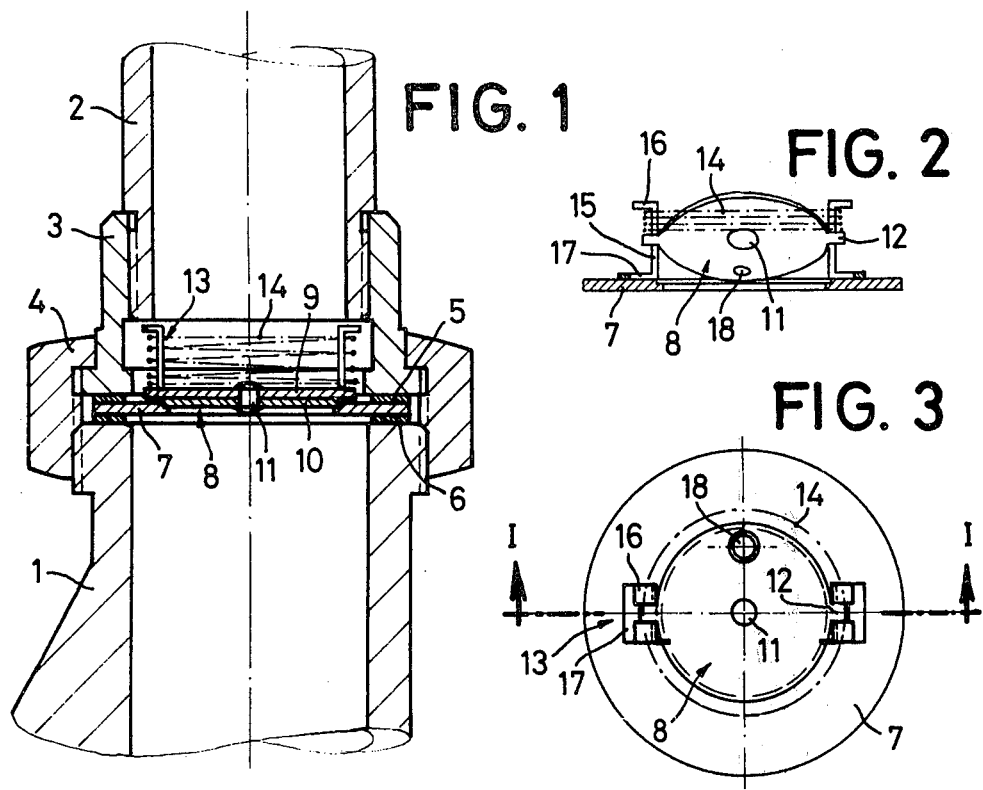

BACK-PRESSURE VALVE FOR HEATING INSTALLATIONS

CROSS-REFERENCE

This is a divisional application of the patent application with the Ser. No. 36,904 filed on May 7, 1979 now U.S. Pat. No. 4,273,155 in the name of Karl Euerle. U.S. Pat. Nos. 3,700,001, 3,878,861 and 968,916 have been cited as prior art references during prosecution of that application. No other anticipatory prior art or references are known to contemplate the object and advantages and construction of the present invention.

BRIEF SUMMARY OF THE INVENTION

The invention concerns and relates to an improved back-pressure valve, specifically for heating installations, with an annular mask having a through-flow opening and being mountable between two coaxially joining pipe sections, and having a sealing disc and a spring action mechanism in the closing direction. Back-pressure valves of this kind are called disc back-pressure valves in a double sense because on one hand the sealing component is disc-shaped and on the other hand the valve assembly is conceived as a supporting disc, i.e. a proper housing and the corresponding connection means are missing. The valve is preferably fitted directly into the pipe system, e.g. in a screw joint, especially of a circulation pump, or between two flanges.

BACKGROUND OF THE INVENTION

Known back-pressure valves have a coil spring with a smaller diameter than the sealing disc, the coil spring resting full-face against the disc area. Although the sealing disc may swivel around a central transversal axis to a certain degree due to the flexibility of the spring, it is seen that it can move essentially only in an axial direction. Other sealing discs have at least four radially protruding guiding ribs which provide a guide along the wall of a casing for axial motion only of the disc. The flow resistance and hence the loss of pressure with an open back-pressure valve is relatively important in the pipe system concerned.

SUMMARY OF THE INVENTION

The invention proposes a disc pressure valve having a lower flow resistance when open.

Starting from a back-pressure valve of the kind initially described the problem is solved, according to the preferred embodiment of the invention, by arranging the sealing disc pivotable and movable in a straight line on the mask and by a device combining the pivoting motion with the straight line motion. The combined pivoting and straight line motion automatically increases the through-flow section of the open valve, making it greater than the through-flow sections of other known disc back-pressure valves.

In a preferred form of an embodiment of the invention the sealing disc has only two protuberances being diametrically opposed and protruding into guides arranged parallel to the axis of the mask, a coil spring having a greater diameter than the sealing disc and pushing against the protuberances. In this arrangement the sealing disc acts as a flap pivoting around a central transversal axis being movable lengthwise. This flap may first be lifted axially, as do known sealing discs. Due to the unstable arrangement of the axis and as a consequence of the vortecies of the flow the flap immediately has a tendency to pivot, which increases the through-flow section.

To support and improve the pivoting motion it is proposed to arrange a weight on the sealing disc on one side of the connecting line of the protuberances.

The guides for the protuberances, being simultaneously abutments for the spring are arranged on the edge of the through-flow opening of the mask. It must be pointed out that a good exploitation of the available pipe section is extremely important with the disc back-pressure valves since with this type of valve no diameter increase over the pipe diameter is possible.

BRIEF DESCRIPTION OF THE SEVERAL VIEWS OF THE DRAWING

The above and other objects and advantages of the invention will become apparent upon full consideration of the following detailed description and accompanying drawings in which:

FIG. 1 is a cross-sectional view of a closed back-pressure valve taken along line 1—1 of FIG. 3;

FIG. 2 is also a cross-sectional view of the back-pressure valve being open;

FIG. 3 is a plan view of the back-pressure valve according to FIG. 1.

DETAILED DESCRIPTION OF THE PREFERRED EMBODIMENT

Referring now to the drawings there is shown in FIG. 1 a disc back-pressure valve mounted in a screw joint of a circulation pump 1. A pipe 2 is screwed into a threaded flange 3 being screwed to the circulation pump 1 with a coupling nut 4. An annular mask or support element 7 is fitted between two seals 5 and 6 laying between the threaded flange and the pump outlet. The mask has a circular opening being covered by a sealing disc 8. The sealing disc is composed of an upper cover disc 9 and a lower seal disc 10 being held together by a rivet 11 in the center. The seal disc 10 is a circular disc of an appropriate material while the cover disc 9 is metallic and has two diametrically opposed protuberances or ears 12. Said protuberances slide into two diametrically arranged guides 13 affixed to the mask 7 and are urged or held down by a coil spring 14. The guides 13 are U-shaped sheet metal parts consisting of a web 15 and two flanges 16 and 17 extending radially outwardly, the flange 17 being a little longer and affixed to the mask by spot-welding. The guides 13 have a longitudinal slot cutting into two separate parts the web 15 and the upper flange 16, the lower flange 17 only being in one part. The protuberances 12 can pivot and move up and down in the slots of the web 15. The coil spring is abutting on one side of the protuberances 12 and on the other side on the upper flanges 16. A small weight 18 is off-centrically secured to one-half of the sealing disc 8.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. An improved back-pressure valve assembly for insertion in connectable joints of pipe lines, comprising an annular support element having a central aperture, and a seat area surrounding said central aperture, diametrically opposed pairs of guide members affixed to said annular support element and including outer support ends, a pair of juxtaposed upper and lower disc members arranged to cooperate with said central aperture, to close and open said central aperture at least one of said disc members arranged to register in said seat area to close said central aperture and wherein at least one of said disc members includes oppositely extending ears positioned relative to said guide members to glide between said pairs of guide members, a spring means which encircles said guide members between said outer support ends on said pairs of guide members and said ears on said at least one disc member, said spring means applying a force on said ears on said at least one disc member to force said at least one disc member in a normally closed position.

2. An improved back pressure valve as defined in claim 1, further wherein said upper disc member is provided with said oppositely extending ears.

3. An improved back pressure valve as defined in claim 1, further wherein said lower disc is provided with a weight means.

4. An improved back pressure valve as defined in claim 1, further wherein said pairs of guide members include radially extending flanges which are formed as a part of said support ends.

* * * * *